United States Patent [19]

Brown et al.

[11] Patent Number: 4,519,094

[45] Date of Patent: May 21, 1985

[54] LPC WORD RECOGNIZER UTILIZING ENERGY FEATURES

[75] Inventors: Michael K. Brown, Piscataway; Lawrence R. Rabiner, Berkeley Heights, both of N.J.

[73] Assignee: AT&T Bell Laboratories, Murray Hill, N.J.

[21] Appl. No.: 411,834

[22] Filed: Aug. 26, 1982

[51] Int. Cl.³ .............................................. G10L 1/00
[52] U.S. Cl. .................................... 381/43; 364/513.5
[58] Field of Search ................................... 381/41–50; 364/513.5

[56] References Cited

U.S. PATENT DOCUMENTS

| | | | |
|---|---|---|---|
| 3,916,105 | 10/1975 | McCray | 381/41 |
| 4,156,868 | 5/1979 | Levinson | 381/43 |
| 4,282,403 | 8/1981 | Sakoe | 381/43 |
| 4,319,085 | 3/1982 | Welch et al. | 381/43 |

Primary Examiner—E. S. Matt Kemeny
Attorney, Agent, or Firm—Jack S. Cubert

[57] ABSTRACT

In a speech recognition arrangement, a speech pattern is recognized as one of a plurality of reference patterns for which acoustic feature signal templates are stored. Each template includes a time frame (e.g., 10 millisecond) sequence of spectral features e.g., LPC and nonspectral e.g., acoustic energy (E) normalized to the peak energy over an utterance interval. LPC and normalized energy feature signal sequences are produced for an unknown speech pattern. For each time frame, the correspondence between the LPC features of the speech pattern and each reference is measured as well as the correspondence between the energy (E) features. In comparing the unknown speech features to those of the reference templates, the dynamic time warp distance $DT=D_{LPC}+\alpha D_E$ is used where $\alpha$ is a weighting factor selected to minimize the probability of erroneous recognition.

18 Claims, 8 Drawing Figures

LPC WORD RECOGNIZER UTILIZING ENERGY FEATURES

BACKGROUND OF THE INVENTION

Our invention is related to speech analysis and more particularly to arrangements for automatically recognizing a speech pattern.

In processing, control and communication systems, it is often advantageous to use speech as input for information, data and commands. Speech input signals may be utilized to automatically record transaction data in data processing equipment or request information from data processing equipment over telephone or other types of voice connections. Speech recognition facilities permit an operator to interact with data processing or control equipment by voice without interruption of other activities. The successful use of voice signals in such applications requires that utterances be recognized as particular words or phrases. Accurate recognition, however, is difficult because of the complexity of speech patterns and their variability from speaker to speaker and even for a particular speaker.

In many known speech recognition systems, an input speech pattern is analyzed to provide a set of features characteristic thereof. Such feature signals may be derived through a spectral, linear prediction, or other analysis of successive time intervals of the speech pattern. Initially, the recognition apparatus is trained by generating feature signal templates for utterances of identified reference patterns. Subsequent to the storage of the reference pattern feature signal templates, an unknown utterance is analyzed and the sequence of feature signals for the unknown utterance is compared to the template sequence of the reference patterns. After the comparisons are completed, the unknown utterance is identified as the reference pattern whose feature signals most closely correspond to the feature signals of the unknown utterance.

The comparison of the feature sequence of an utterance to the feature sequence of a reference template requires time alignment of the feature sequences to account for differences in speech rate and articulation and measurement of the similarity of corresponding features. The log likelihood ratio for linear prediction coefficient (LPC) features of linear prediction analysis disclosed in the article, "Minimum Prediction Residual Principle Applied to Speech Recognition" by F. Itakura, *IEEE Transactions on Acoustics, Speech and Signal Processing*, Vol. ASSP-23, No. 1, pp. 67–72, February 1975, is of the form:

$$d(U,R) = \log[(a_R V_U a'_R)/(a_U V_U a'_U)] \quad (1)$$

and provides a high degree of recognition accuracy with relatively little processing. $a_R$ is a vector of the $(p+1)$ linear predictive coefficient of a $p^{th}$ order LPC model of the reference, $a_U$ is a similar vector for the utterance, and $V_U$ is the $(p+1 \times p+1)$ autocorrelation matrix of the utterance pattern frame. Time alignment optimization is generally accomplished as is well known in the art by dynamic programming. As applied to speech recognition, dynamic programming is used to determine the total distance between an utterance feature sequence, e.g., $$U = [U(1), U(2), \ldots, U(n), \ldots U(N)] \quad (2)$$

and a feature sequence for the $k^{th}$ reference, e.g., $$R_k = [R_k(1), R_k(2), \ldots, R_k(m), \ldots R_k(M_k)] \quad (3)$$

over all acoustically possible paths $$m = w(n) \quad (4)$$

in accordance with $$D_k = \frac{1}{N} \sum_{n=1}^{N} [d(U(n), R_k(w(n)))] \quad (5)$$

While recognition systems using spectral or linear prediction analysis are well suited to identifying speech patterns, errors occur if the speech patterns to be recognized exhibit anomalies that are not identified in the spectral or prediction parameters. For example, anomalies such as partially voiced words or lip smacks may cause a speech pattern to match incorrect reference words having similar spectral patterns but differing in other respects. It is an object of the invention to provide improved speech recognition in the presence of anomalies in the pattern to be recognized.

BRIEF SUMMARY OF THE INVENTION

The invention is directed to a speech analyzer for recognizing an unknown speech pattern as one of a plurality of reference patterns for which acoustic feature signal templates are stored. Each reference pattern template includes a time frame sequence of acoustic spectral feature signals, e.g., LPC, of a prescribed reference pattern and a time frame sequence of acoustic nonspectral feature signals, e.g., normalized energy E, of the prescribed reference pattern. A time frame sequence of acoustic spectral (LPC) and nonspectral (E) feature signals corresponding to said unknown speech pattern are generated. In comparing the unknown speech pattern parameters to the reference templates, the distance $DT = D_{LPC} + \alpha D_E$ is used where $\alpha$ is a weighting factor selected to minimize the probability of erroneous recognition.

DETAILED DESCRIPTION

Figure 1:
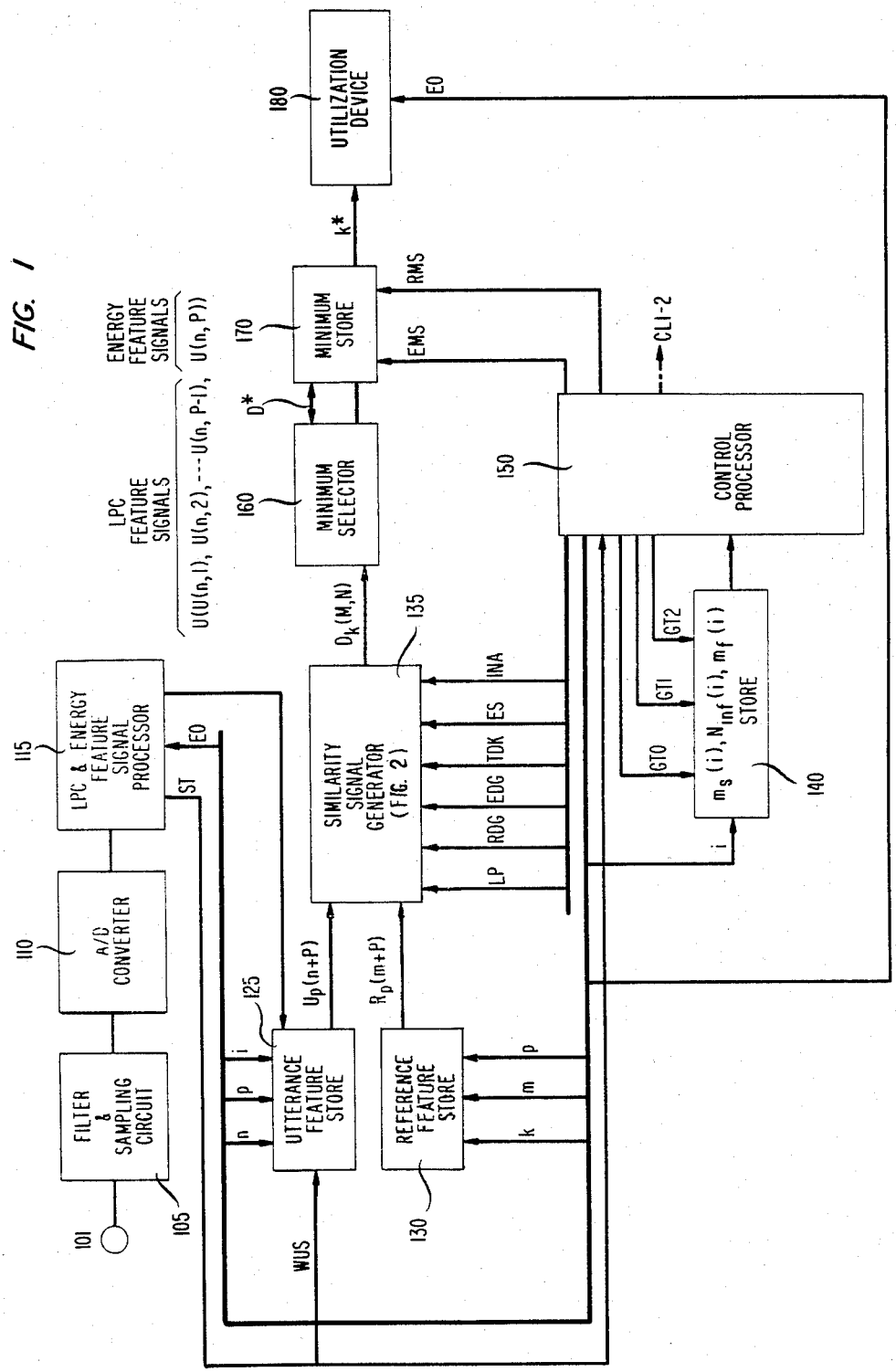
FIG. 1 depicts a general block diagram of a speech recognizer illustrative of the invention.

FIG. 1 shows a general block diagram of a speech recognizer adapted to identify an unknown speech pattern applied to electroacoustic transducer 101. In FIG. 1, the speech pattern signal from transducer 101 is applied to filter and sampling circuit 105. The filter and sampling circuit is adapted to low-pass filter the speech pattern signal to remove noise and unwanted frequency components and to sample the filtered signal at a predetermined rate. The cutoff frequency of the filter may, for example, be 3.2 kHz and the sampling rate may be 6.67 kHz. Analog to digital converter 110 is operative to convert each successive signal sample from circuit 105 into a digitally coded signal representative thereof. The sequence of digitally coded signals is applied to LPC and energy feature signal processor 115.

Feature signal processor 115 is adapted to produce a time frame sequence of acoustic feature signals characteristic of the unknown speech pattern. The time frames may, for example, be 5–50 msec in duration. For each time frame, a set of linear predictive parameter and acoustic energy feature signals are obtained which characterize the frame speech spectrum. The predictive feature signals may then be linearly scaled to a prescribed number of time frames. Processor 115 may comprise a microcomputer arrangement such as one using the Motorola type 68000 microprocessor and associated circuits described in the publication "MC68000 16-Bit Microprocessor User's Manual", Second Edition, Motorola Inc., 1980. The microcomputer is controlled by a set of instructions stored in a read only memory. These permanently stored instructions are set forth in Fortran language form in Appendix A hereto.

As is well known in the art, linear prediction parameters are characteristic of the short term spectrum of a speech waveform but are devoid of other information useful in identifying the unknown speech pattern. LPC and energy feature signal generator 115 is also responsive to the output of converter 110 to produce a set of signals each of which is characteristic of the acoustical energy content of a frame of the speech pattern.

The linear predictive parameter signals for each frame n may be represented as the series:

$$U(n,1), U(n,2), \ldots, U(n,p), \ldots, U(n,P-1) \qquad (6)$$

and the energy feature signal of the frame may be represented as $$U(n,P) \qquad (7)$$

P may, for example, be 10. The succession of frame feature signals $U(n,p)$ is applied to utterance feature store 125 and stored therein as addressed by speech pattern frame index i and feature signal number p.

Reference feature store 130 is adapted to store a set of reference pattern templates to which the unknown speech pattern features are compared. Each template comprises a time frame sequence of feature signals representative of the designated reference pattern k. The set of feature signals for each frame comprises linear predictive feature signals $$R_k(m,1), R_k(m,2), \ldots R_k(m,p), \ldots R_k(m,P-1) \qquad (8)$$

and an energy feature signal $R_k(m,P)$. These features correspond to a representative utterance of the reference pattern. The features of each pattern frame are individually addressable by frame m and feature p in store 130.

Similarity signal generator 135 is adapted to determine the degree of correspondence between the acoustic feature signals of the unknown speech pattern and the feature signals of each reference template. Processing is done in accordance with the principles of dynamic time warping generally described in the article "Considerations in Dynamic Time Warping Algorithms For Discrete Word Recognition" by L. R. Rabiner, A. E. Rosenberg and S. E. Levinson, *IEEE Transactions on Acoustics, Speech, and Signal Processing*, Vol. 26(6), pages 575–582, December 1978, to take into account variations in speech rate and articulation. A signal identifying the best matching reference pattern is selected in minimum selector 160 and stored in minimum store 170.

The operation of a similarity signal generator for linear predictive parameters using the log likelihood ratio distance measure of equation (1) is well known. The introduction of other than LPC spectral feature signals such as energy to improve the accuracy of recognition, however, makes evaluation of pattern similarity much more complicated. One of the sources of difficulty is that the log likelihood ratio does not permit separation of individual components of distance. A second source of difficulty is that the dynamic time warping path is altered by the addition of energy feature signals so that the DTW optimization can be impaired. These complications are resolved in accordance with the invention through the use of a distance metric that is a weighted sum of the linear predictive parameter distance signal and the energy feature distance signal. The weighting factor is selected to minimize the probability of erroneous recognition.

In accordance with the invention, a first signal $D_{LPC}(s,t)$ is generated which represents the time warped distance from the predictive features of an unknown pattern of class s to the predictive features of a reference pattern of class t. A second signal $D_{ER}(s,t)$ representative of the energy feature distance between the unknown pattern of class s and the reference pattern of class t along the time warp path is also generated. These distance signals are combined to form a total similarity signal $$D_T(s,t) = D_{LPC}(s,t) + \alpha D_{ER}(s,t) \qquad (9)$$

$\alpha$ is chosen to appropriately weight the separate distance measures so that the probability of error is minimized. The unknown utterance (class s) is incorrectly classified if the distance between pattern features of different classes is smaller than feature distances between patterns of the same class, i.e., $$D_T(s,t) - D_T(s,s) < 0 \qquad (10)$$

Such errors occur under three conditions. (a) There is a linear predictive feature error only, i.e., $$D_{LPC}(s,t) - D_{LPC}(s,s) < 0$$

while $$D_{ER}(s,t) - D_{ER}(s,s) > 0 \qquad (11)$$

(b) There is an energy feature distance error only, i.e., $$D_{LPC}(s,t) - D_{LPC}(s,s) > 0$$

but $$D_{ER}(s,t) - D_{ER}(s,s) < 0 \qquad (12)$$

or (c) both predictive feature signal distance and energy feature signal distances are erroneous.

An error in predictive feature distance under condition (a) can be recovered by selecting $$\alpha > \left| \frac{D_{LPC}(s,t) - D_{LPC}(s,s)}{D_{ER}(s,t) - D_{ER}(s,s)} \right| \quad (13)$$

Similarly, an error in energy feature distance under condition (b) can be recovered if $$\alpha < \left| \frac{D_{LPC}(s,t) - D_{LPC}(s,s)}{D_{ER}(s,t) - D_{ER}(s,s)} \right| \quad (14)$$

Errors in both predictive and energy feature distances under condition (c), however, are not recoverable.

In selecting $\alpha$ for optimum results, a random variable $$\eta = \left| \frac{D_{LPC}(s,t) - D_{LPC}(s,s)}{D_{ER}(s,t) - D_{ER}(s,s)} \right| \quad (15)$$

is defined. In terms of $\eta$, an error occurs if $\eta$ is greater than a selected $\alpha$ for a predictive feature distance error of condition (a) and if $\eta$ is less than the selected $\alpha$ for an energy feature distance error under condition (b). The probability of an error as a function of $\alpha$ is $$P(E,\alpha) = P(a)\int P(\eta|a)d\eta + P(b)\int P(\eta|b)d\eta + P(c) \quad (16)$$

where P(a), P(b), P(c) are the probabilities of an error under conditions (a), (b), and (c), respectively, and p($\eta$ a) and p($\eta$ b) are the probability densities related to conditions (a) and (b), respectively. The error probability of Equation (16) is optimized by forming the derivative function $$\frac{dP(E,\alpha)}{d\alpha} = -P(a)p(\eta|a)\bigg|_{\alpha opt} + P(b)p(\eta|b)\bigg|_{\alpha opt} = 0 \quad (17)$$

Figure 8:
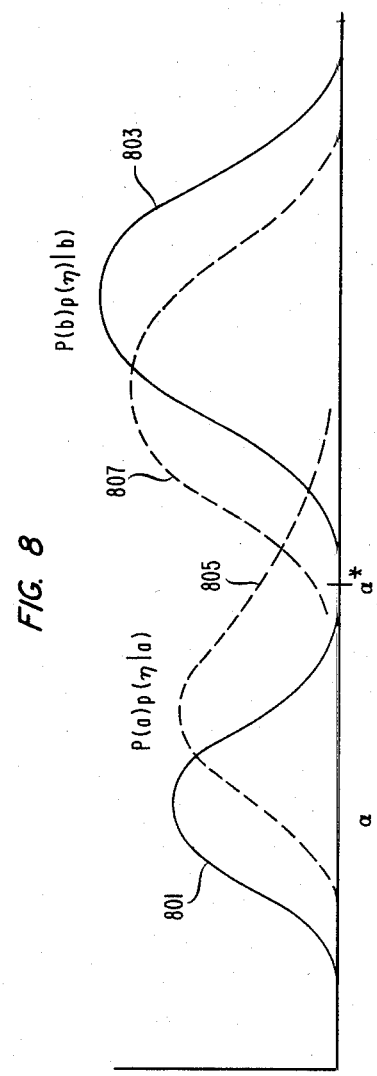
FIG. 8 shows waveforms illustrating the selection of parameters used in the signal processing of FIG. 1.

Waveform 801 of FIG. 8 illustrates the P(a)p($\eta$ a) function. Waveform 803 illustrates the P(b)p($\eta$|b) function. Under good conditions, the mean of P(a)p($\eta$|a) is low corresponding to a small predictive feature distance error and the mean of P(b)p($\eta$|b) is high corresponding to a small energy feature distance error. The use of the combined similarity signal of Equation (9) provides improved recognition in the presence of errors in either predictive feature distance or energy feature distance. The accuracy of recognition using Equation (9) is not decreased with respect to the use of predictive features alone when the statistical properties of the predictive and energy features are not separable as indicated in dotted waveforms 805 and 807. $\alpha$ may be a predetermined factor in the range between 2 and 3 or may be selected for an individual speaker based on an histographic or other well known statistical analysis of his speech patterns.

The circuit of FIG. 1 incorporates both linear predictive feature distance signals and energy feature distance signals in the dynamic time warping similarity signal generation. In the dynamic time warp arrangements of FIG. 2, the time alignment paths are constrained in accordance with $$D_k(m,n) = d(m,n) + \min[D_k(q,n-1)] \quad (18)$$
$$m - I_2 \leq q \leq m - I_1$$

where $1 \leq m \leq M$ are reference pattern feature signal frames, $1 \leq n \leq N$ are speech pattern feature signal frames and $D_k(m,n)$ is the accumulated distance for a path from frame (1,1) to frame pair (m,n) for reference k. d(m,n) is the local feature distance between the features of reference frame m and unknown speech pattern frame n. The rightmost term of equation (18) is the accumulated distance up to speech pattern frame n−1 and reference pattern candidate frame G where $m-I_2 \leq q \leq m-I_1$. $I_1$ is chosen to conform to allowable speech rate and articulation differences. It may, for example, be set to 1 if w(n−1)=w(n−2) and set to zero otherwise. w(n−1) is the warping path to frame n−1 of the unknown speech pattern, and w(n−2) is the warping path to frame n−2 of the unknown speech pattern. $I_2$ is typically set to 2. Thus q extends over the range from m−2 to m−1 if w(n−1)=w(n−2) and extends over the range from m−2 to m otherwise. For each speech pattern frame n there is a sequence of reference template frames m which are acoustical candidate frames. Where variations in speech rate and articulation are assumed to be within a 4-to-1 ratio, the candidate frames m are within the range $$m_{min}(n) = \max[\tfrac{1}{2}(n-1)+1, M-2(N-n), 1] \quad (19)$$

$$m_{max}(n) = \min[2(n-1)+1, M-\tfrac{1}{2}(N-n), M] \quad (20)$$

The range of candidate frames is permanently stored in read only memory 140 as coded signals $m_s(i)$, $N_{inf}(i)$ and $m_f(i)$. ROM 140 is addressed by frame index i from control processor 150. Signal $N_{inf}(i)$ represents the number of frames from m(i)=1 to $m_{min}(i)-1$, $m_s(i)$ represents frame $m_{min}(i)$, and $m_f(i)-1$ represents candidate frame $m_{max}(i)$. Table 1 illustrates the contents of ROM 140 for frame indices i from 1 to 40.

TABLE 1

| i | $m_s$ | $N_{inf}$ | $m_f$ | i | $m_s$ | $N_{inf}$ | $m_f$ |
|---|---|---|---|---|---|---|---|
| 1 | 1 |  | 1 | 21 | 16 | 2 | 26 |
| 2 | 1 | 11 | 3 | 22 | 17 | 2 | 27 |
| 3 | 2 | 10 | 5 | 23 | 18 | 2 | 28 |
| 4 | 2 | 8 | 7 | 24 | 19 | 2 | 29 |
| 5 | 3 | 7 | 9 | 25 | 20 | 2 | 30 |
| 6 | 3 | 5 | 11 | 26 | 21 | 2 | 31 |
| 7 | 4 | 4 | 12 | 27 | 22 | 2 | 32 |
| 8 | 4 | 3 | 13 | 28 | 23 | 2 | 33 |
| 9 | 5 | 3 | 14 | 29 | 24 | 2 | 34 |
| 10 | 5 | 2 | 15 | 30 | 25 | 2 | 35 |
| 11 | 6 | 2 | 16 | 31 | 26 | 2 | 36 |
| 12 | 7 | 2 | 17 | 32 | 27 | 2 | 36 |
| 13 | 8 | 2 | 18 | 33 | 28 | 3 | 37 |
| 14 | 9 | 2 | 19 | 34 | 29 | 3 | 37 |
| 15 | 10 | 2 | 20 | 35 | 30 | 4 | 38 |
| 16 | 11 | 2 | 21 | 35 | 32 | 5 | 38 |
| 17 | 12 | 2 | 22 | 37 | 34 | 7 | 39 |
| 18 | 13 | 2 | 23 | 38 | 36 | 8 | 39 |
| 19 | 14 | 2 | 24 | 39 | 38 | 10 | 40 |
| 20 | 15 | 2 | 25 | 40 | 40 | 11 | 40 |

Figure 6:
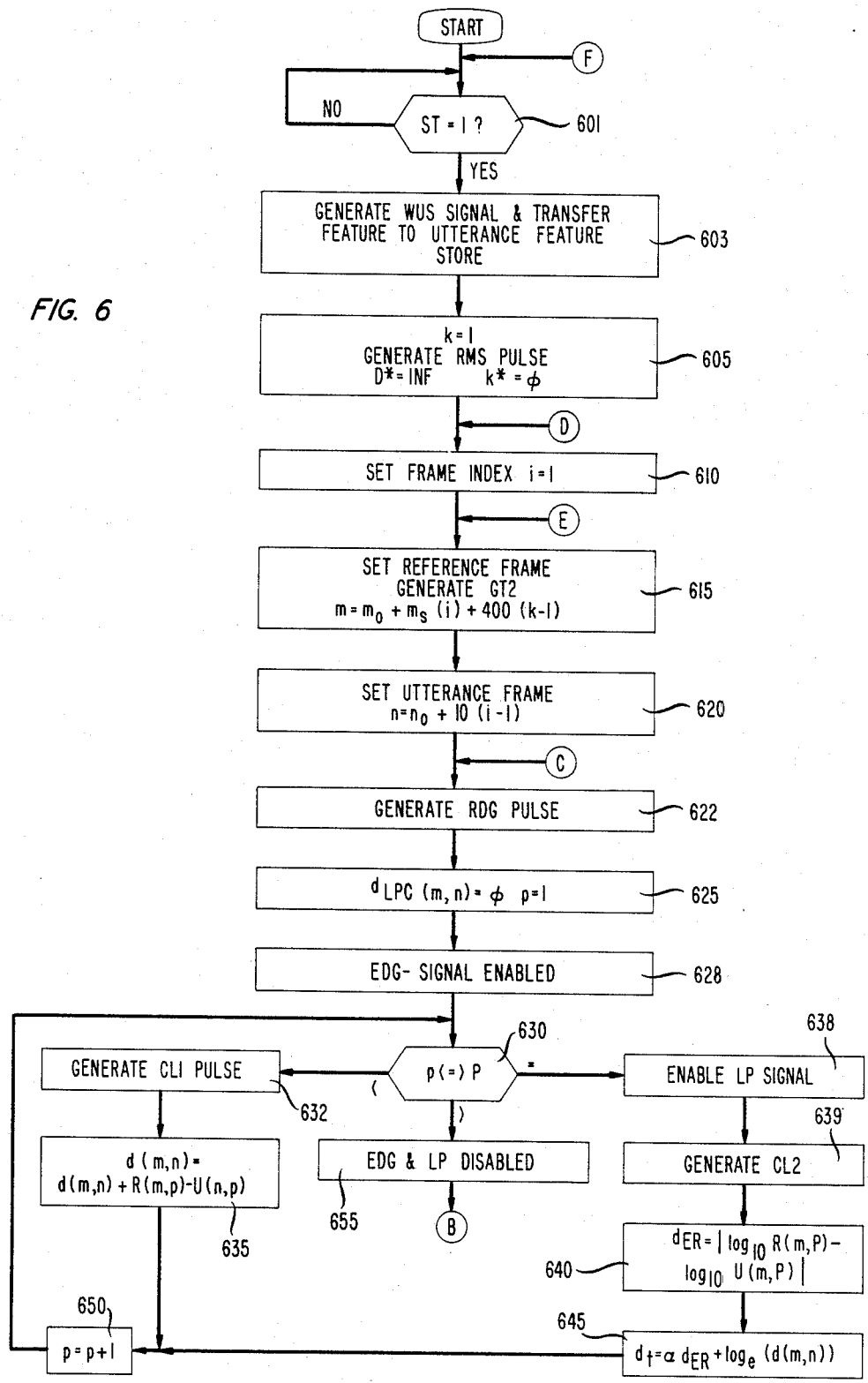
FIGS. 6 and 7 show flow charts useful in illustrating the operation of the speech recognizer of FIG. 2.
Figure 7:
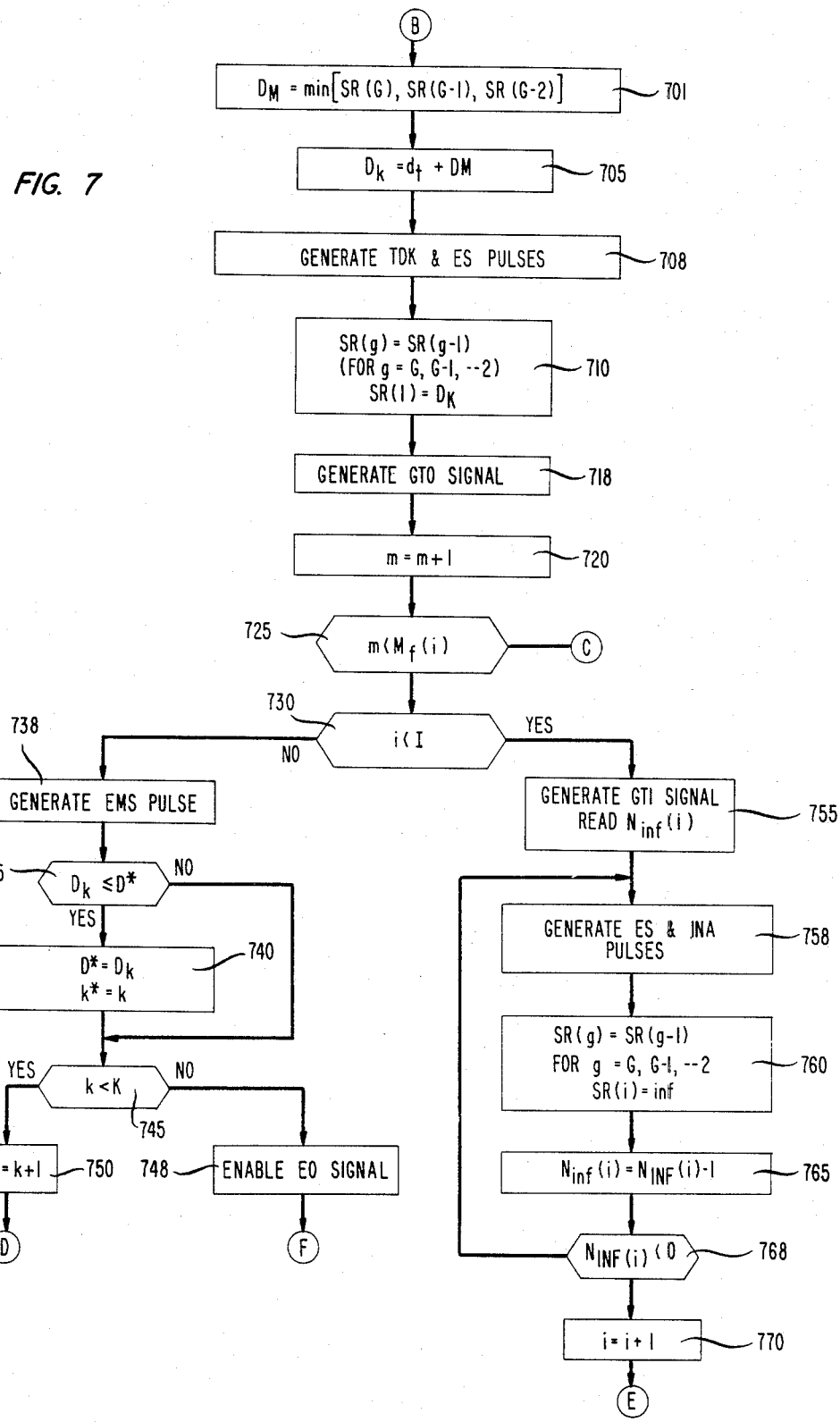

The similarity signal generation in the circuit of FIG. 1 is illustrated in the flow diagrams of FIGS. 6 and 7. While the circuit of FIG. 1 is operating, LPC feature signal processor 115 and energy feature signal generator 120 produce and store coded acoustic features corresponding to speech pattern signal from microphone 101. Feature generator 115 includes an endpoint detector arrangement such as disclosed in U.S. Pat. No.

3,909,532 issued to L. R. Rabiner et al. on Sept. 30, 1975. Upon detection of the endpoint of the speech pattern, the endpoint detector causes the feature signals in generator 115 to be normalized to 40 frames and enables signal ST which is applied to control processor 150. As indicated in box 603, processor 150 enables utterance feature store 125 by supplying write signal WUS so that the LPC feature signals and the energy feature signals from processor 115 may be transferred thereto.

Upon detection of signal ST, control processor 150 also supplies the sequence of frame address signals i and a sequence of P feature address signals for each frame so that the feature signals of the successive frame are entered into the successive locations of the store. For each frame signal i, nine successive LPC feature signals and an energy feature signal for the frame are inserted into the $i^{th}$ frame location of the utterance feature store. Utterance feature store 125 then contains a predetermined number of frame feature signals, e.g., 400 for 40 frames.

After completion of the transfer of speech pattern features to store 125, the circuit of FIG. 1 is placed in the state determined in operation box 605 of FIG. 6. Template index k is set to address the first reference word. The D* and k* locations of minimum store 170 which hold the recognition output signals are reset to infinity and zero, respectively, by pulse RMS from processor 150. Similarity generator 135 is also initialized so that the cumulative distance signals therein correspond to the first frame condition. Frame index i is the set to 1 as per box 610 and reference template frame number m as well as speech pattern frame n are initially set in accordance with boxes 615 and 620. Signals n and p from process controller 150 control the readout of feature signals from utterance feature store 125. Signals k, m, and p control the readout of reference features.

Processor 150 may be a microprocessor such as the aforementioned Motorola type 68000 used in conjunction with a read only memory as is well known in the art. The read only memory contains instructions in coded form to provide the sequence of control signals described herein. Appendix B lists the control program in Fortran language.

In accordance with the aforementioned principles of dynamic time warping, a range of reference template candidate frames is selected for each speech pattern frame from ROM 140. These candidate reference template frames correspond to acoustically possible alignments between the speech pattern and the reference template to which it is compared. A correspondence signal is obtained for each reference candidate frame and the correspondence signals of the current and preceding frames are combined according to predetermined acoustical restraints to form a cumulative correspondence signal. The range of reference template frames for each frame index i is predetermined according to imposed acoustical restrictions and is stored as signals $N_{inf}(i)$, $m_s(i)$ and $m_f(i)$ in read only memory (ROM) 140.

The feature signals of the beginning frame of the first reference template in store 130 and the feature signals of the beginning frame of the speech pattern in store 125 are addressed after the initialization operation. The distance signal generation in similarity signal generator 135 for each frame index i comprises forming a distance signal $$d_t(m,n) = \log_e\left[\sum_{p=1}^{P-1}[R_k(m,p)U(n,p)]\right] + \alpha|\log_{10}(R_k(m,P)) - \log_{10}(U(n,P))| \quad (21)$$

for the currently selected speech pattern frame n and candidate reference pattern frame m and combining the distance signal $d_T$ with the accumulated distance signals for the preceding speech pattern frame $n-1$ according to the prescribed acoustical restrictions. The process is repeated for each reference candidate frame $m_s(i) \leq m \leq m_f(i) - 1$. The resulting distance signals are stored for use in processing the correspondence signals of the succeeding frame index $i+1$.

Figure 2:
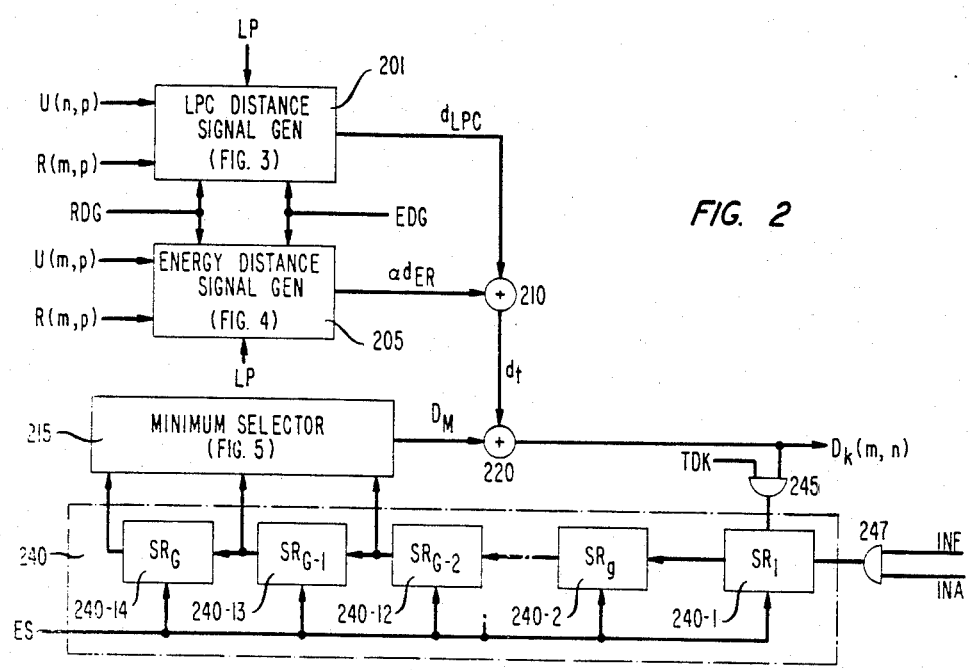
FIG. 2 shows a detailed block diagram of a similarity signal generator useful in the circuit of FIG. 1.

Similarity signal generator 135 is shown in greater detail in FIG. 2. Referring to FIG. 2, the generator comprises LPC distance signal generator 201, energy distance signal generator 205, multi-stage shift register 240, minimum selector 215, and adders 210 and 220. Shift register 240 stores the cumulative distance signals for the candidate reference template frames of the immediately preceding speech pattern frame. Selector 215 is adapted to select the minimum stored cumulative distance signal of the reference template candidate frames for the $i-1$ frame index in accordance with the restrictions of equation (18).

Adder 210 is utilized to combine the LPC and energy distance signals for the current pair of reference template candidate and speech pattern frames, and adder 220 is operative to form the cumulative distance signal for the current reference candidate and speech pattern frame pair. The output of adder 200 is supplied to register 240-14 1 as the cumulative distance signal to be used in the similarity signal processing for the succeeding speech pattern frame. For purposes of illustrating the operation of the circuit of FIG. 2, it is assumed that frame index i is 1. Shift register 240 was initially set so that stage 240-14 stores a zero signal while each of the remaining register stages stores a signal corresponding to infinity as represented by the largest possible number.

Figure 3:
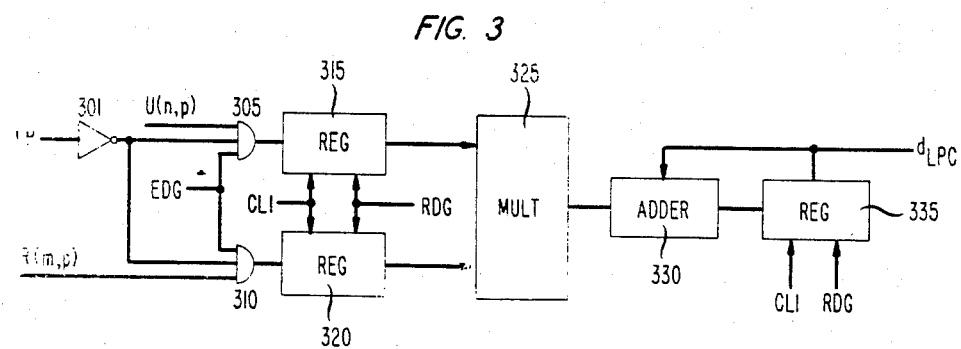
FIG. 3 shows a detailed block digram of an LPC distance signal generator useful in the circuit of FIG. 2.

LPC distance signal generator 201 shown in greater detail in FIG. 3 is operative to form the LPC distance signal for the current frame pair. Referring to FIG. 3, registers 315, 320 and 335 are initially reset to their zero states by signal RDG so that signal $d_{LPC}(m,n)$ is zero. Signal p from controller 150 is initially set to 1. The first LPC parameter of the speech pattern from feature store 125 is applied to register 315 via AND gate 305 responsive to enabling signal EDG from processor 150. In similar manner, the first LPC feature signal for the current reference template candidate frame is applied to register 320 via AND gate 310 from feature store 130. Responsive to clock pulse CL1 from processor 150, the U(n,1) signal and the R(m,1) signal are inserted into registers 315 and 320, respectively.

Figure 4:
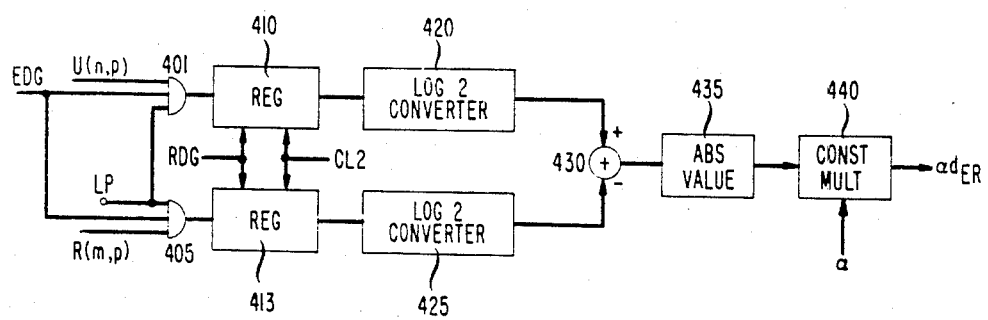
FIG. 4 shows a detailed block diagram of an energy distance signal generator useful in the circuit of FIG. 2.

The product signal U(n,1)·R(m,1) is formed in multiplier 325. The signal $d_{LPC}(m,n) = [U(n,1) \cdot R(m,1)]$ formed in adder 320 is placed in register 335 and registers 315 and 320 receive signals U(n,2) and R(m,2) responsive to the next CL1 clock pulse. After the nine feature signals of the current frame pair are successively processed, register 335 contains the LPC distance signal $$d_{LPC}(m,n) = \log_e \left[ \sum_{p=1}^{P-1} [R(m,p)U(n,p)] \right] \quad (22)$$

for the frame pair m,n. When p=10, signal LP is enabled so that gates 305 and 310 are blocked and gates 401 and 405 in the energy distance signal generator circuit of FIG. 4 are opened.

Speech pattern energy feature signal U(n,10) and the reference template energy feature signal R(m,10) of the current frame pair are then inserted in previously cleared registers 410 and 415, respectively, by clock pulse CL2. The processing through log converter circuits 420 and 425, subtractor circuit 430 and absolute value circuit 435 produces the energy distance signal $$d_{ER}(m,n) = |\log_{10}R(m,10) - \log_{10}U(m,10)| \quad (23).$$

In accordance with the invention, the energy distance signal is weighted by a predetermined factor signal $\alpha$ in multiplier 440 to form the weighted energy distance signal $\alpha d_{ER}$. The $d_{LPC}(m,n)$ signal from register 335 and the $\alpha d_{ER}(m,n)$ signal from multiplier 440 are summed in adder 210 of FIG. 2 to form the distance signal $d_t(m,n)$ for the current frame pair.

Figure 5:
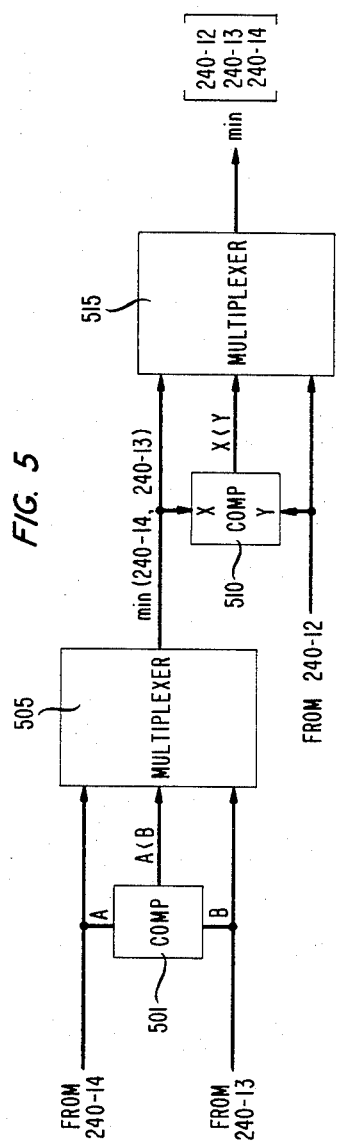
FIG. 5 shows a detailed block diagram of a minimum selector circuit useful in the circuit of FIG. 2.

Minimum selector 215 shown in greater detail in FIG. 5 receives the zero signal initially inserted into register 240-14 and the infinity signals initially inserted into registers 240-12 and 240-13. Comparator 501 in FIG. 5 generates an enable output when the signal in shift register stage 240-13 is less than the signal in shift register stage 240-14. Responsive to the zero signal in stage 204-14 and the infinity signal in stage 240-13, the output of comparator 501 remains disabled. Multiplexer 505 then provides a path for the zero signal from register 240-14 to the output of multiplexer 505. Comparator 150 is operative to compare the output of multiplexer 505 with the signal stored in shift register stage 240-12. Since the zero signal from multiplexer 505 is less than the signal from register 240-12, comparator 510 remains disabled. The zero signal from multiplexer 505 then passes through multiplexer 515 and appears at the output thereof. Adder 220 is adapted to form the cumulative distance signal $D_k(1,1)$ for the current frame pair. The output of adder 220 is supplied to register 240-1 via AND gate 245 and passes therethrough responsive to control pulse TDK from processor 150. Signal ES is also supplied to the clock input of register 240-1 from processor 150. Consequently, the cumulative distance signal for the current frame pair is shifted into register 240-1 and the signals in the remaining stages are shifted one stage.

Referring to the flow diagram of FIG. 6 for frame index i=1 of reference word template k=1, operation box 615 is entered after i is set to 1 in index setting box 610. Frame index signal i from control processor 150 is supplied to store 140 along with signal GT2 and signal $m_s(i)$ is addressed. Responsive to the $m_s(i)$ signal from memory 140, processor 150 is operative to form the first reference candidate frame signal m in accordance with box 615. Speech pattern frame n is then generated in processor 150 as per operation box 620. Signal RDG is generated by processor 150 (box 622) to reset registers 315, 320 and 335 in the LPC distance generator of FIG. 3 and registers 410 and 415 in the energy distance generator of FIG. 4. Signal $d_{LPC}(1,1)$ at the output of register 335 is thereby reset to zero. Feature signal index p in processor 150 is set to 1 and the initialization of the similarity signal generator is completed according to box 625. Signal EDG is then enabled in processor 150 as per box 628.

The loop for LPC distance signal generation including decision box 630, clock generating box 632, signal d(m,n) forming box 635, and index incrementing box 650 is then rendered operative. For address signal p=1, speech pattern feature signal U(n,1) is addressed in utterance feature store 125 while reference word feature signal $R_1(m,1)$ is output by reference feature store 130. Signal EDG from processor 150 activates gates 305 and 310 in FIG. 3. Feature signal U(n,1) is then placed in register 315 and signal $R_1(m,1)$ is placed in register 320 responsive to the CL1 clock pulse from processor 150 (box 632). Multiplier 325 and adder 330 are then operative to form the distance signal in accordance with box 635 and the distance signal at the output of adder 330 is placed in register 335 responsive to the next CL1 clock signal. During the multiplication and addition operations, the p address signal is incremented in accordance with box 650. The loop including decision box 630, operation box 635, and index incrementing box 650 is repeated until address signal p=10. Register 335 then contains the LPC distance signal $d_{LPC}$ for the current frame pair and the energy distance signal formation loop including operation boxes 638, 640 and 645 and index incrementing box 650 is activated.

When the p address signal is 10, processor 150 enables signal LP (box 638). Responsive to signals LP and EDG, gates 401 and 405 in FIG. 4 are activated. The speech pattern energy feature signal U(n,10) and the reference template energy feature signal $R_1(m,10)$ are placed in registers 410 and 415, respectively, responsive to signal CL2 from processor 150 (box 639). Log converter circuits 420 and 425, adder circuit 430 and absolute value circuit 435 are then operative to form the energy distance signal for the frame pair as per box 640 and the weighted energy distance signal is generated in multiplier 440. The LPC distance signal and weighted energy distance signal are thereafter summed in adder 210 as per operation box 645.

p is incremented to 11 in box 650 and compared to P=10 in decision box 630. Since p is greater than 10, signals EDG and LP are disabled (box 655) and box 701 in FIG. 7 is entered. Minimum selector 215 causes the minimum of the signals in registers 240-12 through 240-14 to be applied to one input of adder 220 as per box 701. As aforementioned, register 240-14 contains zero while registers 240-12 and 240-13 contain infinity representative signals. Consequently, the zero signal from register 240-14 is added to the current frame distance signal $d_t$ in adder 220. Control processor 150 then enables signal TDK (box 708). The output of adder 220 is then applied to register 240-1 via AND gate 245 while the signals in the stages of register 240 are shifted left one place responsive to signal ES (box 708). The shift operation is indicated in operation box 710 of FIG. 7.

After the cumulative distance signal $D_1(1,1)$ is placed in register stage 240-1 and the remaining stages of register 240 are shifted, control processor 150 is operative to increment the reference template candidate frame signal m to two as per index incrementing box 720. Signal GTO is then applied to store 140 from processor 150 (box 718) so that signal $m_f(1)$ is supplied to the processor. As indicated in decision box 725, processor 150 compares the incremented reference template candidate frame m=2 to signal $m_f(1)$ from store 140. Signal $m_f(1)=1$ as shown in FIG. 8, signifying that the candidate frame processing for frame index $i=1$ has been completed. The current frame index is then compared to the final frame index $I=40$ in processor 150 as per decision box 730.

Box 755 is now entered and processor 150 supplies signal GT1 to store 140. The $N_{inf}(i)$ signal is read out and sent to processor 150. Responsive to signal $N_{inf}(i)$, processor 150 sends $N_{inf}(i)$ shift pulses to shift register 240. Gate 247 is activated by signal INA from processor 150 (box 758) and an infinity corresponding signal INF is placed in register stage 240-1 during each shift operation. The shift operations continue until signal $N_{inf}(i)$ is decremented to zero. The shift operations are indicated on FIG. 7 in the operation loop including boxes 758, 760, 765, and 768. Upon termination of the shift operations, register stage 240-12 contains the $D_1(1,1)$ signal while each of the remaining stages contains an infinity representative signal. Frame index i is then incremented as per index incrementing box 770 in processor 150 so that the dynamic time warping for the second speech pattern frame may be started.

Box 615 in FIG. 6 is entered from box 770 at the beginning of the second speech pattern frame processing. The first reference candidate frame $m_s(i)$ for frame index $i=2$ is obtained from store 140 and the speech pattern frame corresponding to index $i=2$ is generated in processor 150 as indicated in operation boxes 615 and 620. The current frame pair distance signal $d_f(2,1)$ is then formed in signal generators 201 and 205 and adder 210 as previously described with respect to flow chart boxes 625, 628, 630, 632, 635, 638, 639, 640, 645 and 650. Minimum selector 215 receives the infinity representative signals from registers 240-13 and 240-14 and the $D_1(1,1)$ signal from register 240-12 and transfers signal $D_1(1,1)$ to adder 220.

The cumulative distance signal $D_1(1,2)$ from the output of adder 220 is supplied to shift register stage 240-1 via AND gate 245 responsive to the TDK signal from control processor 150. Shift pulse ES from the control processor shifts the signals in register 240 left so that cumulative distance signal $D_1(1,1)$ is moved to register 240-13 while cumulative distance signal $D_1(1,2)$ is entered into register 240-1. The remaining shift register stages contain infinity representative signals. The minimum selection and shifting operations are indicated in boxes 701, 705, 708, and 710 of FIG. 7. The current reference template candidate frame m is then incremented and compared to signal $m_f(2)$ in boxes 720 and 725. As a result of the comparison, distance signal processing is started for the incremented reference template candidate frame in box 622.

The distance signal for the current frame pair $d_f(2,2)$ is formed in distance signal generators 201 and 205 and adder 210 under control of control processor 150. Minimum selector 215 provides signal $D_1(1,1)$ from register 240-13 to adder 220 and the resulting cumulative distance signal $D_1(2,2)$ is shifted into register 240-1 while signal $D_1(1,1)$ is shifted into register 240-14. Decision box 730 is entered from decision box 725 since the incremented reference template candidate frame is not less than signal $m_f(2)$. The $N_{inf}(i)$ signal from store 140 is retrieved responsive to control signal GT1 as per box 755. An infinity representative signal is applied to register 240-1 via AND gate 247 and shift register 240 is shifted left $N_{inf}(2)$ times as per boxes 758, 760, 765 and 768. At the end of the shift operations, registers 240-12 and 240-13 contain signals $D_1(2,2)$ and $D_1(1,2)$, respectively. The remaining stages of shift register 240 contain infinity representative signals. Frame index i is then incremented to three and box 615 is re-entered.

For each frame index i, a set of similarity signals is formed in similarity signal generator 135 in accordance with the restrictions set in read only memory 140. The similarity signal processing for frame index $1=3$ results in the formation of signals $D(2,3)$, $D(3,3)$ and $D(4,3)$. These similarity signals correspond to reference frames 2, 3, and 4. In the processing of frame index $i=30$, similarity signals are formed for reference frames 25 through 34 in accordance with the listing in FIG. 8. When the last frame index $i=40$ is reached, a single similarity signal $D(40,40)$ is generated in accordance with the flow charts of FIGS. 6 and 7. Decision box 735 is then entered via decision boxes 725, 730 and 732. At this time, similarity signal $D_1(40,40)$ is compared to signal D* in minimum selector 160, and the smaller of the signals is stored in minimum store 170 responsive to an EMS pulse from control processor 150. These operations are indicated in decision boxes 732, 735, and 740.

Since signal D* was initially set to an infinity representative value, signal $D_1(40,40)$ is placed in minimum store 170. Decision box 745 is entered to determine whether the last reference pattern has been processed. As long as reference index k is less than the final reference index K, the k index is incremented in box 750 and box 610 is entered to begin the processing for the next reference pattern.

After the final reference pattern has been processed, the minimum distance signal and its index are stored in minimum store 170. Signal EO is generated by control processor 150 in accordance with box 748. Responsive to signal EO, the index signal k* representative of the recognized reference word is transferred to utilization device 150. Signal EO is also applied to feature signal processor 115 to permit normalization and transfer of the next speech pattern.

The signal processing described in the flow charts of FIGS. 6 and 7 with reference to the circuit of FIGS. 1 through 5 may also be performed in a microprocessor arrangement such as the aforementioned Motorola MC68000. The microprocessor arrangement includes a read only memory that permanently stores instructions corresponding to the flowcharts of FIGS. 6 and 7. These permanently stored instructions are listed in Fortran Language form in Appendix C.

While the invention has been described in detail with reference to a particular embodiment, it will be apparent that various changes and modifications can be made by those skilled in the art without departing from the spirit and scope thereof. For example, features other than energy features may be used or may be combined with the energy and spectral features described herein.

| APPENDIX A |
|---|

```
C
      DIMENSION S(300),U(200,10)
      PARAMETER NL=300,NSL=40,IP=10
      PARAMETER IDEV=02K,ST=01K,EO=8192K
C
      ISTART=0
      IEND=0
      EMAX=0.
10    N=0
20    N=N+1
C
C     PROCESS N-TH BUFFER OF SIGNAL
```

APPENDIX A

```
C
      CALL LPCENG(S,NL,U,IP,N)
      IF(U(N,IP).GT.EMAX) EMAX=U(N,IP)
C
C     DETERMINE IF WORD HAS STARTED
C
      CALL ENDPTS(U(N,1),ISTART,IEND)
      IF(ISTART.EQ.0) GO TO 10
C
C     WORD HAS STARTED
C
      IF(IEND.EQ.0) GO TO 20
C
C     WORD OVER -- GENERATE ST PULSE
C
      CALL OUTPUT(ST)
C
C     LINEARLY WARP WORD TO NSL FRAMES
C
      CALL LWARP(U,N,NSL,EMAX)
C
C     TRANSMIT LPC AND ENERGY TO TEST STORE
C
      DO 30 I=1,NSL
      DO 30 J=1,P
30    CALL FSEND(U(I,J),IDEV)
C
C     WAIT FOR PULSE RESET TO BEGIN NEW INPUT
C
      CALL WAIT(EO)
      GO TO 10
C
      STOP
      END
C     ENDPTS--SIMPLE ENDPOINT DETECTOR BASED
         ON ENERGY ALONE
C
      SUBROUTINE ENDPTS(E,IS,IE)
C
C     E=ENERGY OF FRAME
C     IS=1 IF WORD HAS STARTED, 0 OTHERWISE
C     IE=1 TO INDICATE END OF WORD
C
      EMIN=1.E6
C
      IF(E.GT.EMIN.AND.IS.EQ.0) IS=1
      IF(IS.EQ.1.AND.E.LT.EMIN) IE=1
C
      RETURN
      END
C     LPCENG--CALCULATE LPC AND ENERGY FOR A
         GIVEN SPEECH FRAME
C
      SUBROUTINE LPCENG(S,NL,U,IP,N)
      DIMENSION S(300),U(200,10),R(10),PAR(10),APREV(10)
C
C     S=SPEECH ARRAY
C     NL=NO OF SAMPLES FOR LPC AND ENERGY
         ANALYSIS
C     U=MATRIX OF LPC COEFFICIENTS WITH
         ENERGY STORED IN LAST POSITION
C     IP=NO OF COEFFICIENTS (LPC + ENERGY) PER
         FRAME
C     N=CURRENT FRAME NUMBER
C
C     WINDOW SPEECH SAMPLES BY HAMMING
         WINDOW
C
      DO 10 J=1,NL
10    S(J)=S(J)*0.54-0.46*COS((6.24318*(J-1)/(NL-1))
C
C     MEASURE AUTOCORRELATION OF WINDOWED
         FRAME
C
      DO 20 J=1,IP-1
      R(J)=0.
      DO 15 K=1,NL-J+1
15    R(J)=R(J)+S(K)*S(K+J-1)
20    CONTINUE
C
C     SAVE LOG ENERGY
C
      U(N,IP)=10.*ALOG10(R(1))
C
C     CALCULATE LPC COEFFICIENTS
C
      J=1
      RES=R(J)
      PAR(J)=0.
30    J1=J-1
      IF(J1.LT.1) GO TO 50
      DO 40 K=1,J1
      IJ=J-K+1
40    PAR(J)=PAR(J)+APREV(K)*R(IJ)
50    PAR(J)=(-PAR(J)-R(J+1))/RES
55    A(J)=PAR(J)
      J1=J-1
      IF(J1.LT.1) GO TO 70
      DO 60 K=1,J1
      IJ=J-K
60    A(K)=APREV(K)+PAR(J)*APREV(IJ)
70    RES=(1.-PAR(J)*PAR(J))*RES
      DO 80 L=1,J
80    APREV(L)=A(L)
      J=J+1
      IF(J.LE.IP-2) GO TO 30
C
C     CONVERT TO REFERENCE FORMAT
C
      APREV(1)=1.
      DO 90 J=1,IP-2
90    APREV(J+1)=A(J)
      DO 100 J=1,IP-1
      I1=IP+1-J
      A(J)=APREV(J)
      DO 10 K=2,I1
      K1=K+J-1
110   A(J)=A(J)+APREV(K)*APREV(K1)
100   CONTINUE
      A(IP-1)=APREV(IP-1)
      DO 120 J=1,IP-1
      IF(J.EQ.1) U(J,I)=A(J)
      IF(J.NE.1) U(J,I)=2.*A(J)
120   CONTINUE
C
      RETURN
      END
C     LWARP--LINEAR WARP LPC AND ENERGY
         TO FIXED LENGTH
C
      SUBROUTINE LWARP(U,N,NSL,EMAX)
C
C     U=ORIGINAL FEATURE VECTOR (LPC +
         ENERGY)
C     N=NO OF FRAMES IN ORIGINAL WORD
C     NSL=NORMALIZED LENGTH
C     EMAX=ENERGY PEAK FOR AMPLITUDE
         NORMALIZATION
C
      DIMENSION U(200,10),CRW(40,10)
C
      DO 10 I=1,N
10    U(I,10)=U(I,10)-EMAX
C
      DO 12 I=1,10
      CRW(1,I)=U(1,I)
12    CRW(NSL,I)=U(N,I)
C
C     CONSTANT RATIO (N-1)/(NSL-1) IS USED FOR
         WARPING
C
      XSCL=FLOAT(N-1)/FLOAT(NSL-1)
      DO 20 J=2,NSL-1
      Y=FLOAT(J-1)*XSCL+1.
      JY1=Y
      JY2=Y+1.
      A1=JY2-Y
      A2=Y-JY1
      DO 15 I=1,10
15    CRW(J,I)=U(JY1,I)*A1+U(JY2,I)*A2
20    CONTINUE
C
```

APPENDIX A -continued

```
        DO 25 I=1,10
        DO 25 J=1,NSL
25      U(J,I)=CRW(J,I)
        RETURN
        END
```

APPENDIX B

```
C       CONTROL PROCESSOR(150)
C
        DIMENSION NINF(40),MS(40),MF(40)
        INTEGER P,ST,WUS,RMS,GT2,RDG,EDG.CL1,LP,
        CL2,
      1 TDK,ES,GT0,EMS,E0,GT1,INA
        PARAMETER ST=01K, WUS=02K, RMS=04K,
        GT2=08K,
      1 RDG=16K, EDG=32K, CL1=64K, LP=128K,
        CL2=256K,
      2 TDK=512K, ES=1024K, GT0=2048K, EMS=4096K,
        E0=8192K,
      3 GT1=16384K, INA=32768K
        PARAHETER M0=0, N0=0, IP=10, IM=40, KM=40
C
C       RESET ALL IO
C
        CALL IOINIT
C
C       WAIT FOR END OF WORD
C
10      CALL WAIT(ST)
C
C       ENABLE DATA TRANSFER TO STORE
C
20      CALL OUTPUT(WUS)
C
25      K=1
C
C       ENABLE MINIMUM STORE
C
        CALL OUTPUT(RMS)
30      I=1
C
C       RENABLE GT2 TO READ MS(I)
C
40      CALL OUTPUT(GT2)
        M=M0+MS(I)+400*(K−1)
        N=N0+10*(I−1)
C
C       ENABLE RDG
C
50      CALL OUTPUT(RDG)
60      P=1
C
C       ENABLE EDG
C
70      CALL OUTPUT(EDG)
C
80      IF(P.EQ.IP) GO TO 100
        IF(P.GT.IP) GO TO 110
C
        CALL OUTPUT(CL1)
90      P=P+1
        GO TO 80
C
100     CALL OUTPUT(LP)
        CALL OUTPUT(CL2)
        GO TO 90
C
110     CALL CLEAR(EDG)
        CALL CLEAR(LP)
C
120     CALL OUTPUT(TDK)
        CALL OUTPUT(ES)
C
130     CALL OUTPUT(GTO)
C
140     M=M+1
        IF(M.LT.MF(I)) GO TO 50
```

APPENDIX B -continued

```
C
150     IF(I.LT.IM) GO TO 180
        CALL OUTPUT(EMS)
C
160     IF(K.GE.KM) GO TO 170
        K=K+1
        GO TO 30
C
170     CALL OUTPUT(EO)
        GO TO 5
C
180     CALL OUTPUT(GT1)
C
190     CALL OUTPUT(ES)
        CALL OUTPUT(INA)
        NINF(I)=NINF(I)−1
        IF(NINF(I).GE.0) GO TO 190
C
200     I=I+1
        GO TO 40
        STOP
        END
```

APPENDIX C

```
        SUBROUTINE DPWARP(DSTAR, KSTAR)
        DIMENSION SR(14)
        COMMON/DATA/UP(400 ,RP(400=KMAX)
        DIMENSION MSTART(40),MSTOP(40),NINF(39)
        DATA HSTART/1,1,2,2,3,3,4,4,5,5,
      * 6,7,8,9,10,11,12,13,14,15,16,17,18,19,
      * 20,21,22,23,24,25,26,27,28,29,30,32,34,
      * 36,38,40/
        DATA MSTOP/1,3,5,7,9,11,12,13,14,15,
      * 16,17,18,19,20,21,22,23,24,25,26,27,28,
      * 29,30,31,32,33,34,35,36,36,37,37,38,
      * 38,39,39,40,40/
        DATA NINF/11,10,8,7,5,4,3,3,23*2,
      * 3,3,4,5,7,8,10,11/
        DATA SR/2*65536,12*0/
C       INITIALIZATION
        INF=65536
        K=1
        DSTAR=INF
10      I=1
20      M=RA/+MSTART(I)+400*(K−1)
30      N=T140+10*(I−1)
C       DISTANCE CALCULATION
        D=0
        DO 40 P=1,9
40      D=D+RP(M+P)*UP(N+P)
        DLER=IABS(RP(M+10)−UP(N+10))
        DT=DLER*ALPHA+ALOG10(D)
C       COMBINATORICS
        DM=MIN0(SR(12),SR(13),SR(14))
        DK=DT+DM
C       LOAD S.R.
        DO 50 ISR=14,2,−1
50      SR(ISR)=SR(ISR−1)
        SR(1)=DK
C       CHECK FOR TOP OF COL. OF DOTS
        M=M+1
        IF (M.LT.MSTOP(I)) GO TO 30
C       CHECK FOR END OF WARP
        IF (I.EQ.IMAX) GO TO 60
C       UPDATE S.R. WITH INFINITIES
        DO 56 J=1,NINF(I)
        DO 55 JJ=14,2,−1
55      SR(JJ)=SR(JJ−1)
56      SR(1)=INF
C       SETUP FOR NEXT COL. DOTS
        I=I+1
        GO TO 20
C       CLASSIFY DTW (SR(1) CONTAINS $D_r$)
60      IF (SR(1).GE.DSTAR) GO TO 70
        DSTAR=SR(1)
        KSTAR=K
C       SETUP FOR NEXT DTW
```

-continued

APPENDIX C

```
70   IF (K.EQ.KMAX) RETURN
     K=K+1
     G0 TO 10
     END
```

What is claimed is:

1. A speech analyzer for recognizing a speech pattern comprising: means for storing a plurality of reference pattern templates, each template including a time frame sequence of acoustic feature signals of a prescribed reference pattern; means responsive to the speech pattern for generating a time frame sequence of acoustic feature signals corresponding to said speech pattern; means responsive to the feature signals of said speech pattern and said reference pattern templates for generating a set of signals each representative of the similarity between the feature signal sequence of the speech pattern and the feature signal sequence of one of said reference patterns; and means responsive to said similarity signals for identifying the speech pattern as one of the reference patterns; said prescribed reference feature signal sequence and said speech pattern feature signal sequence each comprising at least a time frame sequence of predetermined type acoustic spectral feature signals and a time frame sequence of predetermined type acoustic nonspectral feature signals; said similarity signal generating means including: means responsive to said time frame sequences of speech pattern and reference template spectral and nonspectral feature signals for generating a plurality of signals for each time frame of the speech pattern including a signal measuring the correspondence between said spectral feature signals of the speech pattern time frame and the spectral feature signals of the reference pattern template and a signal measuring the correspondence between the nonspectral feature signals of the speech pattern time frame and the nonspectral feature signals of the reference pattern template; and means responsive to the plurality of correspondence measuring signals for forming a signal for the reference pattern representative of the similarity between said speech pattern and said reference pattern.

2. A speech analyzer for recognizing a speech pattern according to claim 1 wherein said similarity signal forming means comprises:
means for adjusting each predetermined type correspondence measuring signal with a predetermined constant factor; and
means for combining said adjusted predetermined type correspondence measuring signals to produce a similarity signal for the reference pattern.

3. A speech analyzer for recognizing a speech pattern according to claim 1 wherein:
said means for generating a plurality of correspondence measuring signals comprises:
means for generating a first signal representative of the correspondence between predetermined type spectral features of the speech pattern and predetermined type spectral features of said reference pattern;
and means for generating a second signal representative of the correspondence between predetermined type nonspectral features of said speech pattern and predetermined type nonspectral features of the reference pattern.

4. A speech analyzer for recognizing a speech pattern according to claim 3 wherein:
said similarity signal generating means further comprises means operative for each reference pattern for sequentially generating signals representative of the successive time frames of the speech pattern;
said first signal generating means comprises: means responsive to the current speech pattern frame signal for selecting a set of reference pattern frames;
means responsive to the first signals of the current speech pattern frame and the first signals of the selected reference pattern frames for forming a set of spectral correspondence signals for the current speech frame; and
said second signal generating means comprises: means responsive to the second signals of the current speech pattern frame and the second signals of the selected reference pattern frames for forming a set of nonspectral correspondence signals for the current speech frame;
and said similarity signal forming means comprises: means responsive to the sets of spectral and nonspectral correspondence signals of the current and preceding speech pattern frames for generating a similarity signal for the current speech pattern frame.

5. A speech analyzer for recognizing a speech pattern according to claim 4 wherein:
said means for generating a similarity signal for the current speech frame comprises:
means for modifying said nonspectral correspondence signals; and
means for combining the modified nonspectral correspondence signal of the current speech pattern frame with the spectral correspondence signal of the current speech pattern frame.

6. A speech analyzer for recognizing a speech pattern according to claim 5 wherein said means for combining said modified nonspectral correspondence signal and said spectral correspondence signal comprises means for summing said modified nonspectral correspondence signal and said spectral correspondence signal.

7. A speech analyzer for recognizing a speech pattern according to claim 6 wherein said modifying means comprises means for multiplying said nonspectral correspondence signal by a predetermined constant factor.

8. A speech analyzer for recognizing a speech pattern according to claims 3, 4, 5, 6, or 7 wherein said spectral features are linear predictive features.

9. A speech analyzer for recognizing a speech pattern according to claim 8 wherein said nonspectral features are energy features.

10. In a speech analyzer having a plurality of stored reference pattern templates, each comprising a time frame sequence of feature signals of a prescribed reference pattern, a method for recognizing a speech pattern comprising the steps of:
generating a time frame sequence of acoustic feature signals corresponding to said speech pattern;
generating a set of signals each representative of the similarity between the feature signal sequence of the speech pattern and the feature signal sequence of one of said reference patterns responsive to the feature signals of said speech pattern and said reference pattern templates;
and identifying the speech pattern as one of said reference patterns responsive to said similarity signals;

said prescribed reference feature signal sequence and said speech pattern feature signal sequence each comprising at least a time frame sequence of predetermined type acourstic spectral feature signals and a time frame sequence of predetermined type acoustic nonspectral feature signals;

said similarity signal generating step comprising:

generating a plurality of signals for each time frame of the speech pattern, including a signal measuring the correspondence between said spectral feature signals of the speech pattern time frame and the spectral feature signals of the reference pattern template and a signal measuring the correspondence between the nonspectral feature signals of the speech pattern and the nonspectral feature signals of the reference pattern template responsive to said time frame sequences of speech pattern and reference pattern template spectral and nonspectral feature signals;

and forming a signal for the reference pattern representative of the similarity between said speech pattern and said reference pattern responsive to the plurality of correspondence measuring signals.

11. A method for recognizing a speech pattern according to claim 10 wherein the similarity signal forming step comprises:

adjusting each predetermined type correspondence measuring signal with a predetermined constant factor;

and combining the adjusted predetermined type correspondence measuring signals to generate a similarity signal for the reference pattern.

12. A method for recognizing a speech pattern according to claim 10 wherein:

the step of generating a plurality of correspondence measuring signals comprises:

generating a first signal representative of the correspondence between predetermined type spectral features of the speech pattern and predetermined type spectral features of the reference pattern;

and generating a second signal representative of the correspondence between predetermined type nonspectral features of said speech pattern and predetermined type nonspectral features of the reference pattern.

13. A method for recognizing a speech pattern according to claim 12 wherein:

said similarity signal generating step comprises:

for each reference pattern, generating signals representative of the successive time frames of the speech pattern;

said first signal generating step comprises:

selecting a set of reference template frames responsive to the current speech pattern frame signal;

forming a set of spectral signals for the current speech frame responsive to the first signals of the current speech pattern frame and the first signals of the selected reference pattern template frame; and said second signal generating step comprises:

forming a set of nonspectral correspondence signals for the current speech pattern frame responsive to the second signals of the current speech pattern frame and the second signals of the selected reference pattern template frames;

and said similarity signal forming step comprises:

generating the similarity signal for the current speech pattern time frame responsive to the sets of spectral and nonspectral correspondence signals for the current and preceding speech pattern time frames.

14. A method for recognizing a speech pattern according to claim 13 wherein:

the generation of the similarity signal for the current speech pattern frame compises:

modifying said nonspectral correspondence signals; and combining the modified nonspectral correspondence signal of the current speech pattern frame with the spectral correspondence signal of the current speech pattern frame.

15. A method for recognizing a speech pattern according to claim 14 wherein:

the step of combining said modified nonspectral correspondence signal and said spectral correspondence signal comprises summing said modified nonspectral correspondence signal and said spectral correspondence signal.

16. A method of recognizing a speech pattern according to claim 15 wherein:

the step of modifying said nonspectral correspondence signal comprises multiplying said nonspectral correspondence signal by a predetermined constant factor.

17. A method for recognizing a speech pattern according to claims 12, 13, 14, 15, or 16 wherein:

said spectral feature signals are linear predictive feature signals.

18. A method for recognizing a speech pattern according to claim 17 wherein:

said nonspectral feature signals are energy feature signals.

* * * * *